(12) United States Patent
Moore et al.

(10) Patent No.: US 10,938,740 B2
(45) Date of Patent: Mar. 2, 2021

(54) SYSTEM AND METHODS FOR ROUTING TRAFFIC IN A TELECOMMUNICATIONS NETWORK USING TRUNK GROUP IDENTIFICATION

(71) Applicant: Level 3 Communications, LLC, Broomfield, CO (US)

(72) Inventors: Richard D. Moore, Frederick, CO (US); John H. Hearty, Golden, CO (US); Dick A. Richards, Littleton, CO (US); Michael L. Miller, West Bloomfield, MI (US); Claudia M. Combellas, Centennial, CO (US)

(73) Assignee: Level 3 Communications, LLC, Broomfield, CA (US)

( * ) Notice: Subject to any disclaimer, the term of this patent is extended or adjusted under 35 U.S.C. 154(b) by 273 days.

(21) Appl. No.: 15/428,987

(22) Filed: Feb. 9, 2017

(65) Prior Publication Data

US 2018/0054396 A1 Feb. 22, 2018

Related U.S. Application Data

(60) Provisional application No. 62/376,804, filed on Aug. 18, 2016.

(51) Int. Cl.
*H04L 12/927* (2013.01)
*H04L 29/08* (2006.01)
*H04L 29/06* (2006.01)

(52) U.S. Cl.
CPC ........ *H04L 47/803* (2013.01); *H04L 65/1006* (2013.01); *H04L 67/10* (2013.01); *H04L 67/141* (2013.01); *H04L 69/22* (2013.01)

(58) Field of Classification Search
CPC ... H04L 47/803; H04L 65/1006; H04L 67/10; H04L 67/141; H04L 69/22
USPC ........................................................ 709/223
See application file for complete search history.

(56) References Cited

U.S. PATENT DOCUMENTS

| | | | | |
|---|---|---|---|---|
| 9,247,478 B1* | 1/2016 | Gorman | ................ | H04L 61/157 |
| 2002/0001302 A1* | 1/2002 | Pickett | ................ | H04L 12/2856 370/352 |
| 2004/0022237 A1* | 2/2004 | Elliott | ................ | H04L 12/6418 370/356 |
| 2006/0142010 A1* | 6/2006 | Tom | ................ | H04Q 3/0045 455/445 |

(Continued)

*Primary Examiner* — Umar Cheema
*Assistant Examiner* — Tony Williams

(57) ABSTRACT

Aspects of the present disclosure include systems, methods, and devices for routing communications that ingress into a telecommunications network by appending a virtualized trunk group identifier or other customer identifying number within a Session Initiation Protocol (SIP) messages associated with the communications. In one particular embodiment, a user field within header information of SIP messages may be appended with a trunk group identifier unique to a particular customer device providing the communication to the network. Specifically, a customer premise device (such as an integrated access device (IAD)) may be configured to append a customer-specific trunk group identifier number into a portion of a header of a SIP message of the communication. The call and associated SIP message information, including the appended trunk group ID, may then be routed to a host routing device.

15 Claims, 4 Drawing Sheets

(56) References Cited

U.S. PATENT DOCUMENTS

| | | | | |
|---|---|---|---|---|
| 2007/0116234 A1* | 5/2007 | Schneider | H04M 3/58 | |
| | | | | 379/219 |
| 2007/0206568 A1* | 9/2007 | Silver | H04W 76/10 | |
| | | | | 370/352 |
| 2008/0137649 A1* | 6/2008 | Li | H04L 12/66 | |
| | | | | 370/356 |
| 2011/0149750 A1* | 6/2011 | Sharma | H04L 65/80 | |
| | | | | 370/252 |
| 2011/0235517 A1* | 9/2011 | Terpstra | H04L 45/04 | |
| | | | | 370/235 |
| 2012/0090028 A1* | 4/2012 | Lapsley | H04L 63/08 | |
| | | | | 726/22 |
| 2012/0201368 A1* | 8/2012 | Kaushal | H04M 3/42059 | |
| | | | | 379/211.01 |
| 2012/0236750 A1* | 9/2012 | Bugenhagen | H04L 65/608 | |
| | | | | 370/252 |
| 2012/0259722 A1* | 10/2012 | Mikurak | G06Q 10/087 | |
| | | | | 705/26.1 |
| 2013/0163590 A1* | 6/2013 | Bouvet | H04L 41/0896 | |
| | | | | 370/352 |
| 2015/0264089 A1* | 9/2015 | Ramanchandran | | |
| | | | H04L 12/6418 | |
| | | | | 370/254 |
| 2015/0350075 A1* | 12/2015 | Li | H04L 45/745 | |
| | | | | 709/224 |
| 2016/0182980 A1* | 6/2016 | Tschirhart | H04M 3/42306 | |

* cited by examiner

ID

SYSTEM AND METHODS FOR ROUTING TRAFFIC IN A TELECOMMUNICATIONS NETWORK USING TRUNK GROUP IDENTIFICATION

CROSS-REFERENCE TO RELATED APPLICATIONS

This application is related to and claims priority under 35 U.S.C. § 119(e) from U.S. Patent Application No. 62/376,804, filed Aug. 18, 2016 entitled "SYSTEM AND METHODS FOR ROUTING TRAFFIC IN A TELECOMMUNICATIONS NETWORK USING TRUNK GROUP IDENTIFICATION," the entire contents of which is incorporated herein by reference for all purposes.

TECHNICAL FIELD

Aspects of the present disclosure generally relate to telecommunication networks; and more particularly, to systems and methods for routing traffic in a telecommunications network based upon trunk group information and trunk group identification numbers associated with specific trunk groups or customers to the network. Calls ingressing into the telecommunications network may be routed using specific trunk group IDs in order to direct the communications through predetermined portions of the network and to identify a particular customer equipment from which the communications originate into the network.

BACKGROUND

A service provider in the telecommunications industry may be responsible for establishing various communication links across one or more networks and network clusters. For example, the service provider may configure routing elements to route voice traffic that ingress into the service provider's telecommunications network from customer premise equipment, such as an integrated access device (IAD). A call ingressing into the network at an IAD may be associated with a particular trunk group connected to the telecommunications network. Being able to identify information about the particular trunk group, and pass such information downstream in the network may facilitate routing of the call to additional network elements. Further, where calls originate from telephone numbers associated with known subscribers of the service provider, routing elements of the service provider may be operable to route such subscriber calls downstream using the telephone number (such as the ten-digit telephone number derived from the North American Numbering Plan) because the routing elements may have access to database information that matches the subscriber telephone number with a certain trunk group. In other words, using the telephone number of the subscriber, the routing elements may initiate a table look-up to retrieve customer information for the subscriber call from a database. However, such customer information may not be available to the network elements based on a trunk group identifier alone as more than one customer may utilize a trunk group connection to the network.

Also, in some networks, routing elements of the service provider may be tasked with routing calls from telephone numbers which are not known subscriber telephone numbers (e.g. "alien" telephone numbers). The routing elements may not have access to information about the customers to the network utilizing the particular trunk group the calls are received at the network. Further, while certain IADs or other customer premise equipment may be inherently operable to pass along identifying information for calls ingressing into the network, others may not.

It is with these observations in mind, among others, that various aspects of the present disclosure were conceived and developed.

SUMMARY

One implementation of the present disclosure may take the form of a method for routing calls. The method may include the operations of supplementing a header field of a first session initiation protocol (SIP) message associated with a call with an identifier of a trunk group for the call and routing the call to a host routing device using the first SIP message, the first SIP message including the identifier of the trunk group for the call. The method may further include the operations of associating the trunk group with an originating trunk group (OTG) field of a second SIP message associated with the call, the trunk group defined by the identifier of the trunk group for the call and accessing the call with a network server using the second SIP message, the network server configured to complete the call using the OTG field of the second SIP message.

Another implementation of the present disclosure may take the form of a system for routing calls. The system may include a host routing device receiving a call and routing the call through a telecommunications network, the call comprising a supplemented header field of a first session initiation protocol (SIP) message associated with a call with an identifier of a trunk group for the call and a network server that instructs the host routing device to route the call through the telecommunications network based upon trunk group information received from the host routing device. Further, the host routing device is configured to append a header of a second SIP message utilized to route the call from the host routing device to other network elements of the telecommunications network with an originating trunk group (OTG) parameter copied from the identifier of the trunk group for the call.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. The drawings depict only typical embodiments of the present disclosure and, therefore, are not to be considered limiting in scope.

DETAILED DESCRIPTION

Figure 1:
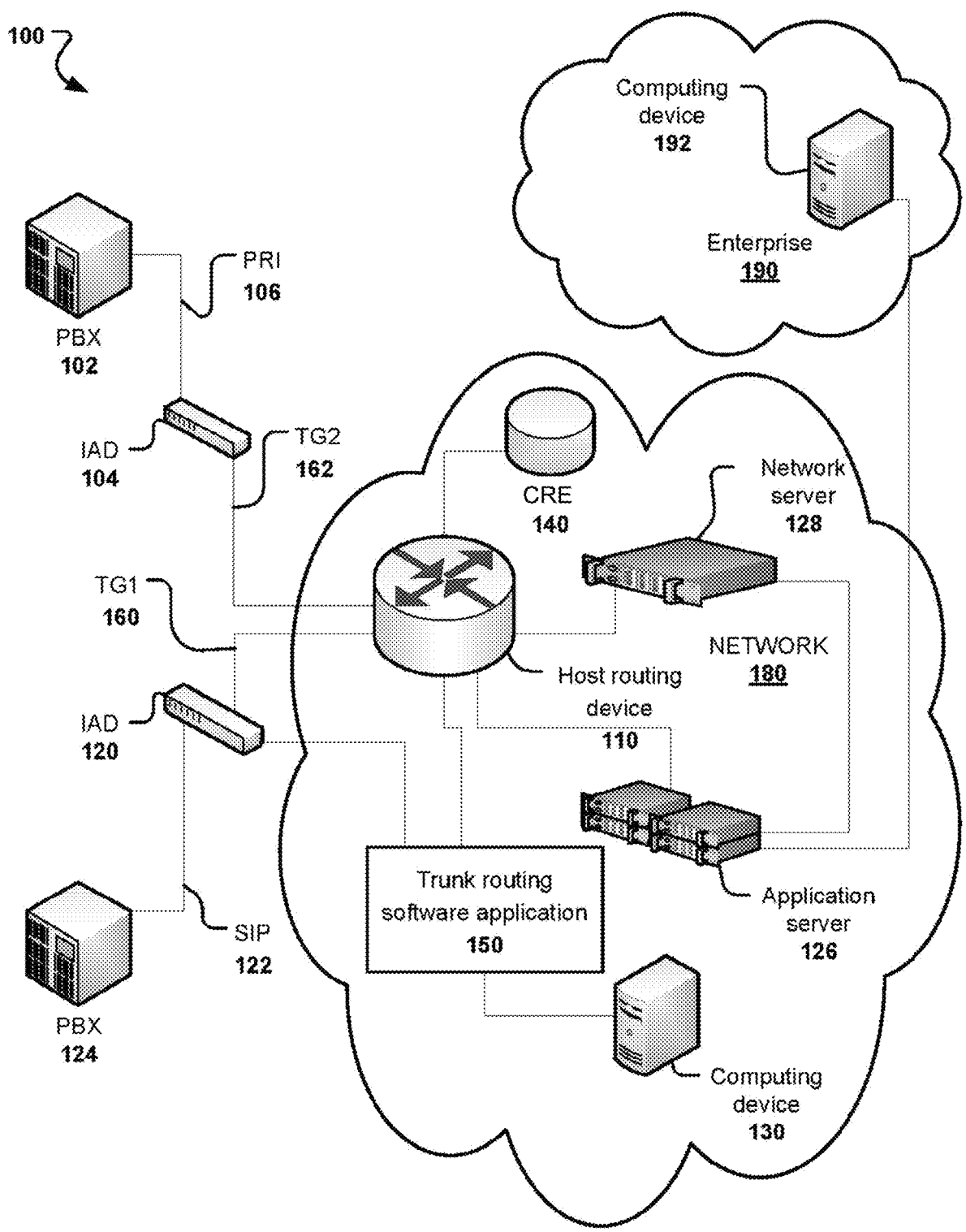
FIG. 1 illustrates an exemplary system for routing calls in a telecommunication network using trunk group identification numbers (ID)s, according to aspects of the present disclosure.

Aspects of the present disclosure include systems, methods, and devices for routing communications that ingress into a telecommunications network of a service provider by initially appending a virtualized trunk group identifier or other customer identifying number within Session Initiation Protocol (SIP) messages associated with the communications. In one particular embodiment, a user field within header information of SIP messages may be appended with a trunk group identifier unique to a particular customer device providing the communication to the network. Specifically, a customer premise device (such as an integrated access device (IAD) or Voice over Internet Protocol (VoIP) Media Gateway) may be configured to append a customer-specific trunk group identifier number into a portion of a header of a SIP message of the communication. For example, appending a user portion of a contact header of a SIP message with the trunk group ID may be executed by the trunk routing application as the call arrives from an integrated access device (IAD). The call and associated SIP message information, including the appended trunk group ID, may then be routed to a host routing device.

At the host routing device, using the trunk routing application, one or more rules may be imposed to copy the trunk group ID from the incoming message and add the ID within an originating trunk group (OTG) ID field of a second SIP message as an OTG parameter for use with further routing of the call. By mapping the trunk group number from the incoming communication to the OTG field, the call may be properly routed downstream from the host routing device to a network server. In turn, the network server and the back end of the telecommunications network may be configured to route and complete the call using the OTG parameter. More particularly, using the OTG parameter, the network server may instruct the host routing device to transmit the call to a particular application server of a respective specific enterprise or specific network cluster that is associated with the trunk group number in order to complete the call.

The aforementioned use of trunk group IDs in a telecommunications network may be especially useful where calls originate from non-subscribers or telephone numbers not recognized by the service provider. In general, telecommunications networks require subscribers or users to register with the network before transmitting communications so that the network may identify and properly route and bill for the incoming calls. However, some networks also support alien telephone numbers at the network that are not pre-registered. In such networks, it is beneficial to identify a customer or subscriber from which the communication originates to route the call to the proper network elements, apply one or more features to the communication, and/or bill the customer accordingly. Although an identification of an incoming trunk group may provide some indication of an originating customer, many subscribers may utilize the same trunk group connection to the network to provide the communication such that identifying a particular customer from the trunk group connection alone may be difficult. However, by virtualizing and assigning a unique trunk group identifier to a customer premise device from which the communication is received, and appending the identifier to the received communication, the network may properly identify the subscriber to continue routing the received call through the network according to a service agreement between the subscriber and the network. In other words, a virtual trunk group identifier may be appended into the header information from the customer's equipment to aid the network in identifying and routing a received communication.

FIG. 1 is an exemplary network topology or system 100 illustrating use of a trunk routing application 150 and trunk group IDs to route calls in a telecommunications network.

The trunk routing application 150 may be executed by a computing device 130 comprising at least one processing unit in communication with at least one tangible storage media, the tangible storage media including a plurality of computer executable instructions for executing steps disclosed herein. As shown, the system 100 may comprise an IAD device 104 and an IAD device 120. The IAD 104 and IAD 120 are a form of customer premise equipment (CPE) operable to provide customers with access to wide area networks and the Internet. The IAD 104 and IAD 120 may aggregate multiple channels of information including voice and data across a shared access link to core networks of a service provider such as network 180.

A private branch exchange (PBX) 102 may be coupled to the IAD 104 and similarly a PBX 124 may be coupled to the IAD 120. The PBX 102 and PBX 124 may comprise phone switches operable to route calls to the IAD 104 and IAD 120. In some embodiments, the IAD 104, IAD 120, PBX 102, and PBX 124 are located at a customer site and/or may be outside a core network 180 of a service provider. In one particular embodiment, the IAD 104 may comprise an Adtran device and the IAD 120 may comprise a Genband device. Signaling between PBXs and IADs may comprise a variety of methods, systems, and protocols including e.g. signaling system 7 (SS7), primary rate interface (PRI), channel associated signaling (CAS), and session initiation protocol (SIP). In the example of FIG. 1, signaling information transmitted from the PBX 102 to the IAD 104 may be communicated using a primary rate interface (PRI) 106 and signaling information transmitted from the PBX 124 to the IAD 120 may be communicated using SIP 122. In other words, the system 100 may include different classes of IADs such that where IAD 104 utilizes PRI, the PBX 102 is PRI-interconnected and where the IAD 120 utilizes SIP, the PBX 124 is SIP-interconnected. The IADs (IAD 104 and 120) may normalize traffic back to a respective PBX (PBX 102 and 124).

The IAD 104 and IAD 120 may be coupled to a host routing device 110 within and/or associated with the core network 180. The core network 180 may comprise a central portion of a telecommunications network that provides various telecommunications services, such as routing of calls, to customers who are interconnected or otherwise have access to the core network 180. The host routing device 110 may comprise at least one of a session border controller (SBC) and may in one specific embodiment comprise a Sonus 7000 SBC or a Sonus 9000 SBC. In general, an SBC is a device deployed within the core network 180 of a service provider to control signaling involved in setting up and tearing down communications between an end user/customer and network elements associated with the telecommunications network. The host routing device 110 may be operable to support and manage real-time SIP traffic and process calls received from the IAD 104 and IAD 120 through the core network 180 and/or back end networks of the service provider. The host routing device 110 may be coupled to a centralized policy server (such as a Centralize Routing Engine (CRE)) 140. The CRE 140 may comprise at least one of a server and a routing database operable to provide call routing and session policy management for the host routing device 110.

The system 100 may further comprise at least one of a network server 128 and a plurality of application servers such as application server 126 coupled to the host routing device 110. In other embodiments, additional network servers and application servers are contemplated. Each of the application servers, such as the application server 126, may be associated with a specific network cluster or enterprise configured to handle certain calls (from e.g. certain trunks). For example, as shown, application server 126 is coupled to a computing device 192 associated with a particular enterprise 190. The application server provides the actual telephony service for the enterprise associated with an ingress trunk. The services may be discrete per enterprise. However, the application server 126 may host processing for multiple enterprises. The services provided by the application server 126 may include call access control (CAC) or what kinds of calls the enterprise can make (long distance, international, etc.), concurrent call paths (CCP) which is a call limit per trunk or enterprise, and telephony services such as call forwarding, hunt groups, auto attendant, announcements, conferencing, and the like.

The network server 128 may receive signaling information about a call ingressing into the network 180 from the host routing device 110. The network server 128 may be operable to determine and select a certain application server for routing the call, and pass along such information to the host routing device 110 based upon trunk group information and/or an originating telephone number. More particularly, the network server 128 may be operable to analyze SIP message information associated with a call as routed from the host routing device 110, match the call with a specific enterprise/network cluster of the telecommunications network (based upon trunk group information or other identifying information), and route the call to e.g. an application server 126 associated with the specific enterprise/network cluster in order to complete the call (with the exception of emergency calls which may be routed to other systems). For a call arriving at the host routing device 110, a policy request may be made to the CRE 140 which may cause the CRE 140 to direct the call to the network server 128 for further routing. Because the core network 180 may comprise multiple network servers, the call may be directed to the network server 128 where the network server 128 is closest to the host routing device 110. In one specific embodiment, the network server 128 comprises at least one Broadsoft device.

As further shown in FIG. 1, the IADs coupled to the host routing device 110 may be preconfigured to send and receive traffic (including calls) to and from the host routing device 110 and the core network 180 via certain trunk groups. As such, calls, or voice traffic may ingress into the core network 180 from IADs via a set of unique predefined trunks. For example, in FIG. 1, a first trunk group (TG1 160) may be associated with the IAD 120 and a second trunk group (TG2 162) may be associated with the IAD 104. In one embodiment, a plurality of IADs, such as IAD 104 and a plurality of IADs such as IAD 120 may utilize a single respective trunk group. As such, a plurality of IADs similar to IAD 104 may be associated with a single trunk group, e.g., the TG2 162, and a plurality of IADs similar to IAD 120 may be associated with a single trunk group, e.g., the TG1 160. The various IADs associated with a single trunk group may be used by a single customer to the core network 180, or may be used by multiple customers to the network.

Some IADs may be preconfigured by a system administrator to provide trunk group parameters or other information defining a unique trunk group for such IADs in a contact field during registration of the devices—which can facilitate proper routing of calls from the IADs downstream from the host routing device. For example, during registration of the IAD 104 with the network 180, the IAD may be equipped to provide trunk group parameters associated with the TG2 162 in a contact field of a header of a registration message transmitted to the host routing device 110. In particular, a REGISTER SIP message may include a header with a contact field that includes a user portion and a host portion. Some information identifying a sender of the message may be included in the contact field of the header. However, as explained above, such information may not provide enough information to the network 180 to properly route or process the communication. Thus, described herein is a system and method to include a unique trunk group identifier within the header information of one or messages from the IAD 104 to the network 180 for processing of the received communication.

Figure 2:
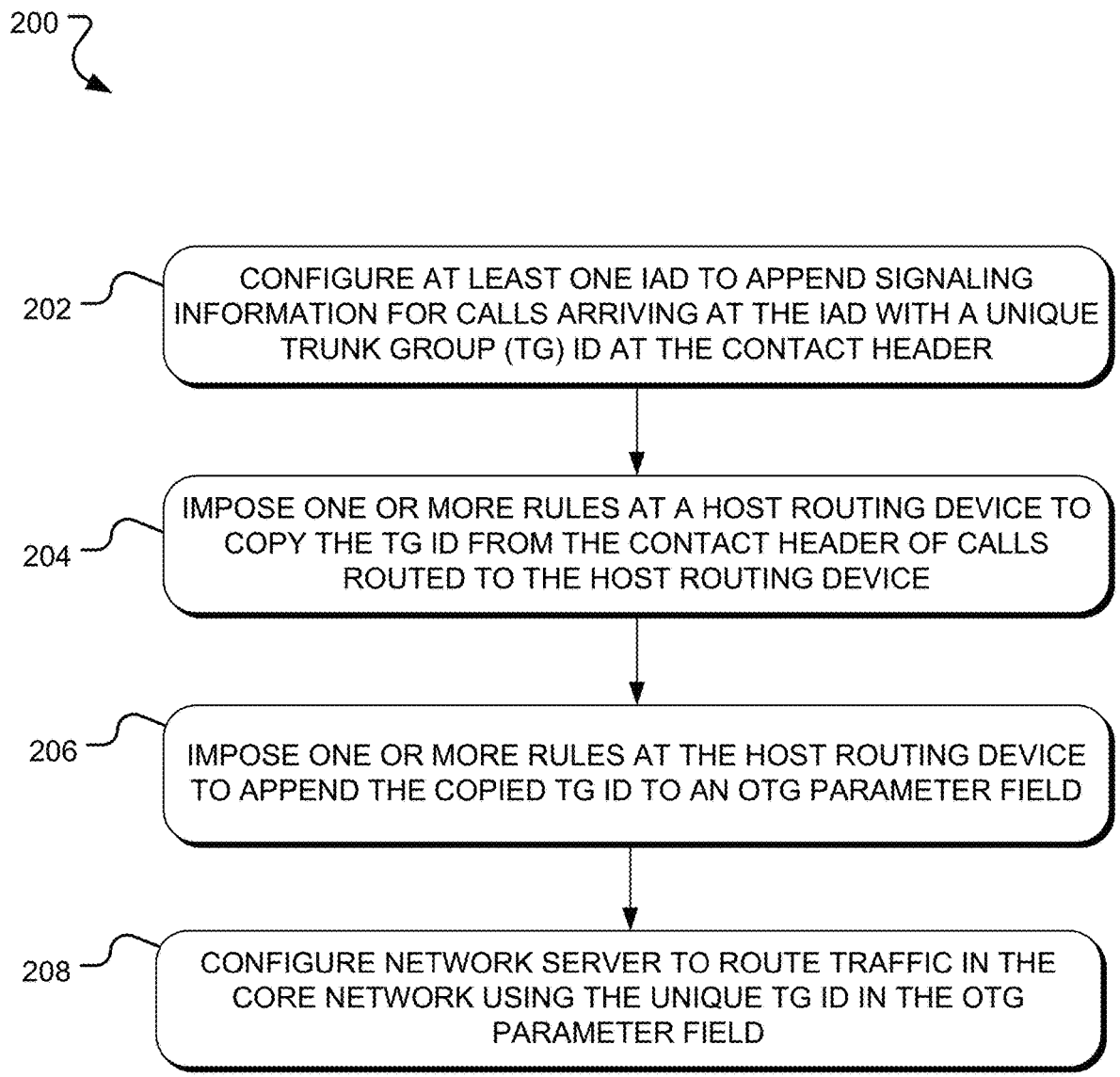
FIG. 2 illustrates an exemplary process flow for configuring a system to route calls in a telecommunications network, according to aspects of the present disclosure.

FIG. 2 is an exemplary process flow 200 for configuring a telecommunications network to route calls using a unique trunk group identifier, with reference to and incorporating aspects of the system 100. In block 202, an IAD device, such as IAD 120, may be configured, using the trunk routing application 150, to supplement information about calls arriving at the IAD 120. Specifically, for calls arriving at devices such as IAD 120, using the trunk routing application 150, a user portion of a contact header of a SIP message associated with such calls may be appended or otherwise supplemented with a unique trunk group ID. As described above, the unique TG ID may be associated with a specific IAD and/or a specific customer or subscriber to the network 180. Upon appending the TG ID to the contact header field, the communication is transmitted to the host routing device 110 of the network 180.

In block 204, using the trunk routing application 150, one or more rules may be imposed on the host routing device 110 to copy each of the TG IDs out of respective user portions of contact headers of the respective calls arriving at the host routing device 110. Further, as shown in block 206, using the trunk routing application 150, one or more rules may be imposed on the host routing device 110 to map the copied TG ID from the user portion of the contact header to an OTG field of a second message for continued routing of the call to network servers, and ultimately application servers which are configured to handle calls associated with specific trunk groups.

In block 208, the network server 128 may be specially configured for the system 100 described above. In particular, the network server 128 may be configured to instruct the host routing device 110 to route calls to application servers based upon trunk group information, instead of using telephone numbers associated with the calls. For example, the network server 128 may be configured to retrieve trunk group information from the OTG field of the SIP message received from the host routing device 110 and route the communication and/or apply one or more telecommunication features to the communications based on an association of the trunk group information with a customer or subscriber to the network. It should be understood that in some embodiments the order of steps in the exemplary process flow 200 may vary such that block 208 may be an initial step of the disclosed configuration process.

Figure 3:
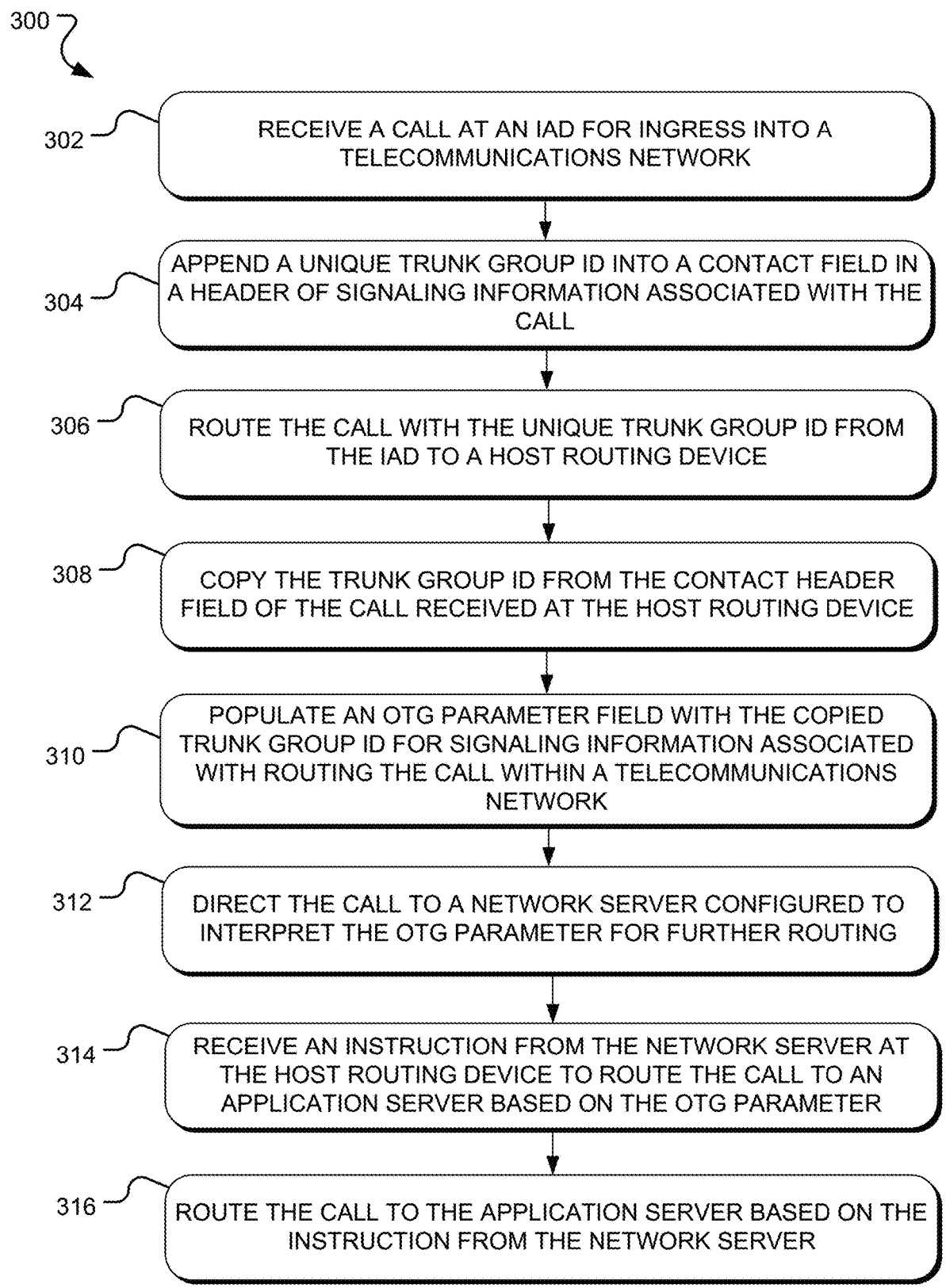
FIG. 3 illustrates an exemplary process flow for routing calls in a telecommunications network, according to aspects of the present disclosure.

FIG. 3 is an exemplary process flow 300 for routing a call using a telecommunications system that routes calls according to a unique trunk group identifier, such as system 100. In block 302, a call may be retrieved from e.g. PBX 124 and be transmitted from the PBX 124 to the IAD 120. In one specific embodiment, the IAD 120 may comprise a Genband Qflex SBC such that the IAD 120 is configured for SIP signaling and the PBX 124 is SIP-interconnected. As shown in FIG. 1, the IAD 120 may be configured to route calls using the TG1 160. In some embodiments, every IAD, or a plurality of IADs similar to IAD 120 may be associated with a common trunk group such that communications from each of the IADs of the group are received at the network 180 through the same trunk group connection.

Using the trunk routing application 150, information about a trunk group identifier associated with a call ingressing into the network 180 from the IAD 120, such as information about TG1 160, may be made available to the host routing device 110. Specifically, as described in block 304, a unique trunk group (TG) ID for the TG1 160, may be appended to a user portion of a header associated with the communication. In one particular embodiment, the unique TG ID may be appended to a user portion of a contact segment of the header of a SIP message associated with the call and transmitted from the IAD 120 to the host routing device 110. The TG ID may be used by the components of the network 180 to uniquely identify a customer to the network that utilizes the particular trunk group (TG1 160) and may also identify a specific IAD associated with the customer, such as IAD 120. The TG ID may be a unit of information used as a label or marker for a header of the SIP message (and later used to identify a customer to the network). The TG ID appended to the call may be a string or set of characters that identifies one or more trunk groups, customer premise equipment, or a customer and is used to specify routing protocols for calls that ingress into the telecommunications network.

As one specific example, a call may be received at the IAD 120 from a telephone number such as 720-111-2222. As such, a contact header field of a SIP message associated with the call may contain a caller number with the value of "7201112222". Before directing the call to the host routing device 110, the trunk routing application 150 may supplement the contact header field with a TG ID such as 12345. The trunk group ID 12345 may be associated with the trunk group TG1 160 and the IAD 120. Thereafter, for example, the contact header of a SIP message associated with the call may be transmitted to the host routing device and include the telephone number "7201112222" and the TG ID of "12345".

In block 306, the call is directed to the host routing device 110. In block 308, using the trunk routing application 150 at the host routing device 110, at least one SIP adaptor rule and/or functions may be implemented to retrieve the TG ID from the SIP message associated with the call. The TG ID may be copied out of the contact header of the call. Further, using the trunk routing application 150, the copied trunk group number defined by the trunk group ID may be retrieved and used to define an originating trunk group parameter. Specifically, in the case of a call routed from the IAD 120, the TG ID may be copied from the contact field. Then, as in block 310, the trunk group number may be used to define an originating trunk group (OTG) parameter and the copied TG ID may be mapped to an OTG field in a second SIP message transmitted from the host routing device 110 to another component of the network 180. In particular, the resulting OTG parameter may be used with a SIP message associated with the call from the host routing device 110 to downstream network elements such as the network server 128. As such, the OTG parameter may be passed downstream to facilitate proper routing of the call. Further, populating the OTG field with the trunk group number for TG1 160 converts signaling information associated with the call to a normalized/standard format for downstream routing.

In block 312, the host routing device may issue a policy request to the CRE 140 and direct the call to the network server 128 based on the originating telephone number and/or the TG ID. Upon receiving the call and associated signaling information (e.g. contents of a SIP message), the network server 128 may be configured to look inside the SIP message, and analyze the OTG parameter within the OTG field to continue routing of the call. Specifically, the network server 128 may be configured to, using one or more databases, match the OTG parameter to a particular application server (and associated enterprise or customer).

In block 314, the network server 128 may issue an instruction to the host routing device 110 to route the call to the application server 126 that the network server 128 has identified using the OTG parameter. The application server, such as application server 126, may be associated with a particular enterprise responsible for handling calls that ingress into the network 180 and the enterprise may particularly be responsible for handling calls associated with a particular trunk group or customer as defined by the OTG parameter. In block 316, the host routing device routes the call to the application server 126 which is associated with a particular enterprise. In this manner, the OTG parameter normalizes signaling behind the host routing device 110.

One benefit of the present disclosure, among many, involves identifying ingress trunks and applying enterprise level services to traffic on that trunk. These services may include call access control, and concurrent path counting. Appending, or otherwise modifying the user portion of the contact header to store an origination trunk ID that identifies a customer to the network, and then unpacking that information at a host routing device, provides these benefits and are applicable to routing calls in a telecommunications network with different devices and architectures.

Figure 4:
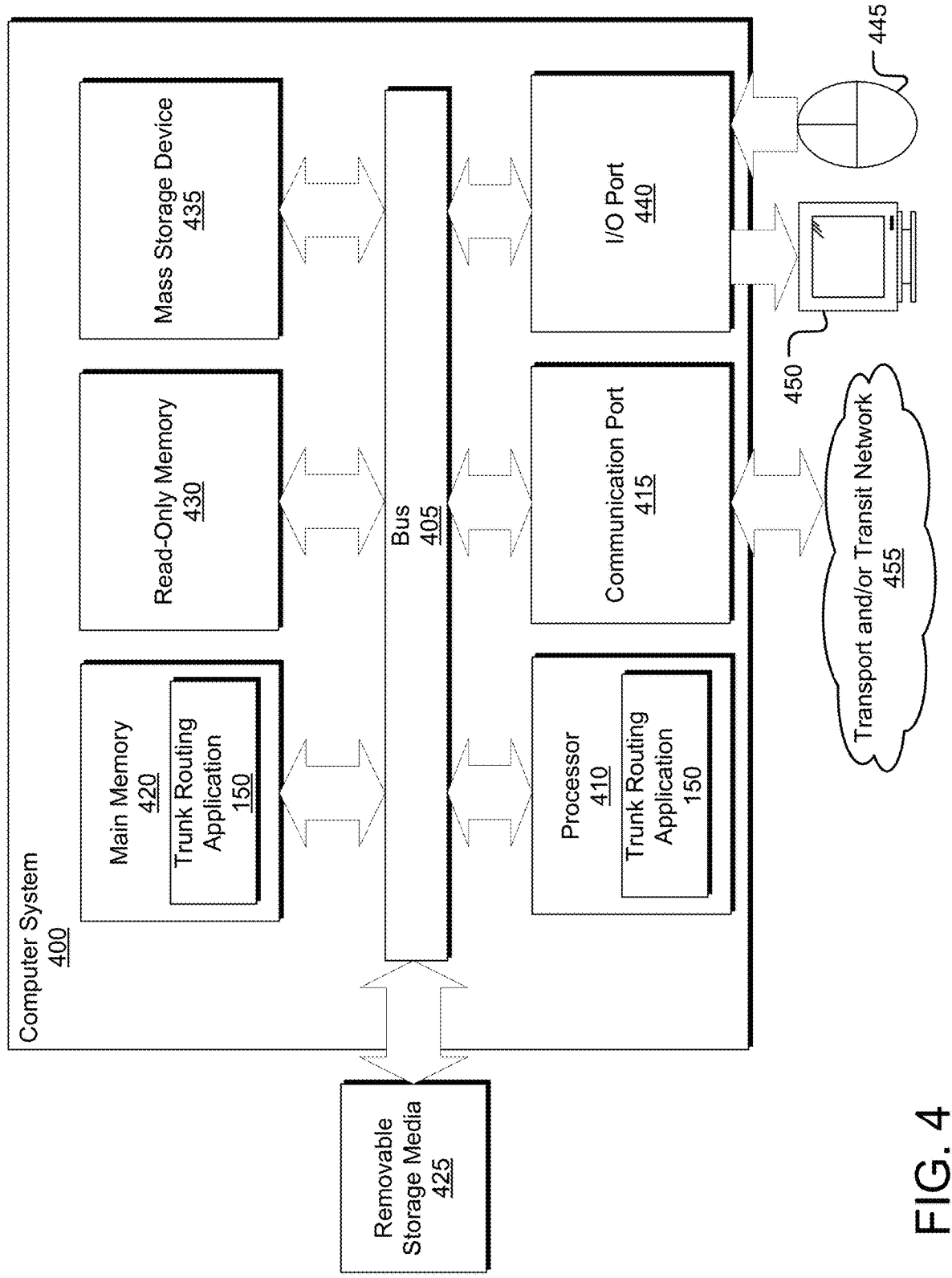
FIG. 4 illustrates an example of a computing system that may implement various services, systems, and methods discussed herein.

FIG. 4 is an example schematic diagram of a computing system 400 that may implement various methodologies discussed herein. For example, the computing system 400 may comprise the computing device 130 used to execute the trunk routing application 150. The computing system 400 includes a bus 405 (i.e., interconnect), at least one processor 410 or other computing element, at least one communication port 415, a main memory 420, a removable storage media 425, a read-only memory 430, and a mass storage device 435. Processor(s) 410 can be any known processor, such as, but not limited to, an Intel® Itanium® or Itanium 2® processor(s), AMD® Opteron® or Athlon MP® processor(s), or Motorola® lines of processors. Communication port 415 can be any of an RS-232 port for use with a modem based dial-up connection, a 10/100 Ethernet port, a Gigabit port using copper or fiber, or a USB port. Communication port(s) 415 may be chosen depending on a network such as a Local Area Network (LAN), a Wide Area Network (WAN), or any network to which the computing system 400 connects. Computing system 400 may further include a transport and/or transit network 455, a display screen 450, an I/O port 440, and an input device 445 such as a mouse or keyboard.

Main memory 420 can be Random Access Memory (RAM) or any other dynamic storage device(s) commonly known in the art. Read-only memory 430 can be any static storage device(s) such as Programmable Read-Only Memory (PROM) chips for storing static information such as instructions for processor 410. Mass storage device 420 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 405 communicatively couples processor(s) 410 with the other memory, storage, and communications blocks. Bus 405 can be a PCI/PCI-X, SCSI, or Universal Serial Bus (USB) based system bus (or other) depending on the storage devices used. Removable storage media 405 can be any kind of external hard drives, thumb drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 420 is encoded with a trunk routing application 150 that supports functionality as discussed above. For example, in one embodiment, the trunk routing application 150 may include or otherwise implement the various processes and/or instructions described herein to route calls according to trunk group information. The trunk routing application 150 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 410 accesses main memory 420 via the use of bus 405 in order to launch, run, execute, interpret or otherwise perform processes, such as through logic instructions, executing on the processor 410 and based on the trunk routing application 150 stored in main memory or otherwise tangibly stored.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

In yet another embodiment, the described disclosure may be implemented on a virtual machine or any type of virtual computing platform. The virtual machine may or may not include any of the components described in relation to FIG. 4. For example, software programs operating within an operating system executed by the processor 410 may implement the trunk routing application 150 to perform one or more of the operations described herein. In general, any operation or device described herein may be executed within a virtual environment on one or more virtual machines.

It is believed that the present disclosure and many of its attendant advantages should be understood by the foregoing description, and it should be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method of routing calls, comprising:
receiving a call at an integrated access device (IAD);
supplementing, by the IAD, a header field of a first session initiation protocol (SIP) message associated with the call with an identifier of a trunk group for the call, wherein the identifier is unique to the IAD, wherein supplementing the header field of the first SIP message associated with the call comprises appending a user portion of a contact header field of the first SIP message with the identifier of the trunk group;
routing the call to a host routing device using the first SIP message, the first SIP message including the identifier of the trunk group for the call;
associating the trunk group with an originating trunk group (OTG) field of a second SIP message associated with the call, the trunk group defined by the identifier of the trunk group for the call;
accessing the call with a network server using the second SIP message, the network server configured to complete the call using the OTG field of the second SIP message;
matching, by the network server, an OTG parameter within the OTG field to a particular application server;
passing, by the network server, an instruction to the host routing device to route the call to the particular application server, the instruction passed from the network server; and routing the call to the particular application server by the host routing device, the particular application server uniquely associated with the trunk group;

wherein the identifier of the trunk group for the call is transmitted to the host routing device as part of the first SIP message associated with the call to make information about the trunk group available for the second SIP message, the second SIP message transmitted from the host routing device to other network elements to complete the call according to the information about the trunk group.

2. The method of claim 1, wherein the network server obtains an originating trunk group value from the OTG field in order to instruct the host routing device as to predetermined routing procedures for the call.

3. The method of claim 1 wherein appending the user portion of the contact header field of the first SIP message with the identifier of the trunk group comprises populating a tgrp parameter of the user portion of the contact header.

4. The method of claim 1, further comprising copying the identifier of the trunk group for the call from the user portion of the contact header field to a host portion of the from header of the second SIP message associated with the call.

5. The method of claim 1, wherein the identifier of the trunk group for the call is uniquely assigned to the IAD and the trunk group across an entire enterprise of a telephony provider.

6. The method of claim 1, wherein the identifier of the trunk group for the call is derived from a virtual trunk group attached to the call.

7. The method of claim 1, wherein the IAD routes calls using a particular predefined trunk group based on a type of IAD device associated with the IAD.

8. The method of claim 1, wherein the network server obtains an originating trunk group value from the OTG field in order to instruct the host routing device as to predetermined routing procedures for the call.

9. The method of claim 8 wherein predetermined routing procedures for the call comprise transmitting one or more signaling messages that include the OTG field.

10. A system for routing calls, comprising:
an integrated access device (IAD) for receiving a call and supplementing a header field of a first session initiation protocol (SIP) message associated with the call with an identifier of a trunk group for the call, wherein the identifier is unique to the IAD;
a host routing device receiving the call from the IAD and routing the call, including the identifier of the trunk group for the call, through a telecommunications network;
a network server that instructs the host routing device to route the call through the telecommunications network based upon trunk group information received from the host routing device;
wherein the host routing device supplements a header of a second SIP message utilized to route the call from the host routing device to other network elements of the telecommunications network with an originating trunk group (OTG) parameter copied from the identifier of the trunk group for the call; and
an application server uniquely associated with the OTG and wherein the network server further matches the OTG parameter to the application server and passes an instruction to the host routing device to route the call to the application server, the host routing device routing the call to the application server in response to the instruction,
wherein the supplemented header field of the first SIP message associated with the call comprises the identifier of the trunk group appended to a user portion of a contact header field of the first SIP message; and
wherein the host routing device further copies the identifier of the trunk group for the call from the user portion of the contact header field to a host portion of a header of the second SIP message associated with the call;
wherein the identifier of the trunk group for the call is transmitted to the host routing device as part of the first SIP message associated with the call to make information about the trunk group available for the second SIP message, the second SIP message transmitted from the host routing device to the other network elements to complete the call according to the information about the trunk group.

11. The system of claim 10 wherein appending the user portion of the contact header field of the first SIP message with the identifier of the trunk group comprises populating a tgrp parameter of the contact header.

12. The system of claim 10, wherein the network server obtains an originating trunk group value from the identifier of the trunk group in order to instruct the host routing device as to predetermined routing procedures for the call.

13. The system of claim 10, wherein the identifier of the trunk group for the call is uniquely assigned to the IAD and the trunk group across an entire enterprise of a telephony provider.

14. The system of claim 10, wherein the identifier of the trunk group for the call is derived from a virtual trunk group attached to the call.

15. The system of claim 10, wherein the IAD routes calls using a particular predefined trunk group based on a type of IAD device associated with the IAD.

* * * * *